(12) United States Patent
Yamamoto et al.

(10) Patent No.: US 6,306,360 B1
(45) Date of Patent: Oct. 23, 2001

(54) SPINEL POWDER AND SPINEL SLURRY

(75) Inventors: Toshio Yamamoto; Akihiko Suda; Masahiro Sugiura, all of Aichi (JP)

(73) Assignee: Kabushiki Kaisha Toyota Chuo Kenkyusho, Aichi-Gun (JP)

( * ) Notice: Subject to any disclaimer, the term of this patent is extended or adjusted under 35 U.S.C. 154(b) by 0 days.

(21) Appl. No.: 09/407,763

(22) Filed: Sep. 29, 1999

(30) Foreign Application Priority Data

| Sep. 30, 1998 | (JP) | 10-278650 |
| Oct. 23, 1998 | (JP) | 10-301891 |
| Aug. 4, 1999 | (JP) | 11-220595 |

(51) Int. Cl.$^7$ .................................................. C01F 7/16
(52) U.S. Cl. ................................................... 423/600
(58) Field of Search ............................................ 423/600

(56) References Cited

U.S. PATENT DOCUMENTS

| 3,702,882 | 11/1972 | Rettew et al. . |
| 4,081,408 | 3/1978 | Fischer, et al. . |
| 4,274,981 | * 6/1981 | Suzuki et al. . |
| 4,474,745 | 10/1984 | Ritter, II . |
| 4,495,304 | * 1/1985 | Yoo et al. . |
| 4,542,112 | * 9/1985 | Matsui et al. . |

FOREIGN PATENT DOCUMENTS

| 1 811 144 | 7/1969 | (DE) . |
| 42 27 720 | 4/1993 | (DE) . |
| 0 110 490 | 6/1984 | (EP) . |
| 0 110 704 | 6/1984 | (EP) . |
| 0 512 843 | 11/1992 | (EP) . |
| 1 282 307 | 7/1972 | (GB) . |
| 1 296 049 | 11/1972 | (GB) . |
| 59-232915 | 12/1984 | (JP) . |

OTHER PUBLICATIONS

R. J. Bratton, Ceramic Bulletin, vol. 48, No. 12, pp. 759 to 762, "Coprecipitates Yielding MgAl$_2$O$_4$ Spinel Powders", 1969.

G. Gusmano, et al., Jounal of the European Ceramic Society, vol. 7, No. 1, pp. 31 to 39, "The Mechanism of MgAl$_2$O$_4$ Spinel Formation From the Thermal Decomposition of Coprecipitated Hydroxides", Jan. 1, 1991.

Derwent Publications, AN 1986–161655, XP–002135217, SU 1 196 334, Dec. 7, 1985.

A. Mazzoni, et al., Chemical Abstracts, vol. 117, No. 16, Oct. 19, 1992, AN 117: 156011, XP–002135216 "Preparation of Spinel Powders (MgAl2O) at Low Temperature by Mechanical Activation of Hydroxide Mixtures", 1991.

K. Waldner, et al., Chemistry of Materials, vol. 8, No. 12, pp. 2850–2857, "Synthesis of a Double Alkoxide Precursor to Spinel (MgAl$_2$O$_4$) Directly From (Al(OH)$_3$, MgO, and Treiethanolamine and Its Pyrolytic Transformation to Spinel," 1996.

Y. Suyama, et al., Cermics International, vol. 8, No. 1, pp. 17–21, "Characterization and Sintering of Mg–Al Spinel Prepared by Spray–Pyrolysis Technique," 1982.

Derwent Abstracts, AN 1985–041018, JP 59–232915, Dec. 27, 1984.

\* cited by examiner

*Primary Examiner*—Steven P. Griffin
*Assistant Examiner*—Christina Ildebrando (57) ABSTRACT

The invention features an MgAl$_2$O$_4$ spinel powder having a specific surface area of 40 m$^2$/g or more and an average diameter of from 3 to 20 μm and having uniform pores, and a slurry containing this spinel powder. The spinel powder is produced by milling (1) an MgAl$_2$O$_4$ spinel powder obtained by synthesizing by the coprecipitation method with the use of hydroxide materials wherein the ratio of the average diameter of aluminum hydroxide "$D_1$" to the average diameter of magnesium hydroxide "$D_2$" satisfies the requirement $1.85 \leq (D_1/D_2)$ or $0.5 > (D_1/D_2)$ and calcining, (2) an MgAl$_2$O$_4$ spinel powder obtained by drying a mixture solution containing water-soluble organic substance having a boiling point of 120° C. or above, converting the dried substance into a complex oxide by heating, or (3) a powder comprising as the main component an MgAl$_2$O$_4$ spinel powder which is obtained by mechanically mixing and milling a mixture of hydroxides for producing a spinel powder to convert into a complex hydroxide, and then heating a mixture composition containing the obtained complex hydroxide with an unconverted hydroxide to thereby convert into a complex oxide.

21 Claims, 4 Drawing Sheets

SPINEL POWDER AND SPINEL SLURRY

FIELD OF THE INVENTION

This invention relates to a spinel powder and a spinel slurry. More particularly, it relates to an $MgAl_2O_4$ spinel powder which is excellent in catalytic activity, in particular, $NO_x$-reduction performance and a slurry containing this powder which can form a coating layer scarcely peeling off and being free from cracking and which can be easily applied onto a catalytic base material, for example, a honeycomb construction to form a catalyst having excellent catalytic activity, in particular, $NO_x$-reduction performance.

BACKGROUND OF THE INVENTION

Spinels have been produced by adjusting the pH of an acidic aqueous solution of a mixture of a water-soluble magnesium salt and a water-soluble aluminum salt with an alkali to form a precipitate of hydroxides and then heating the precipitate to thereby synthesize a spinel, i.e., the coprecipitation method.

As an example of the above-described coprecipitation method, JP-A-59-232915 discloses "a method for synthesizing a spinel by adjusting the pH of an aqueous solution of a mixture of a water-soluble magnesium salt and a water-soluble aluminum salt with an alkali in the presence of alcohol to form a precipitate and then drying and calcining this precipitate to thereby synthesize a spinel" (the term "JP-A" as used herein means an "unexamined published Japanese patent application").

In this method, the coprecipitation is performed by adjusting the pH in the presence of an alcohol so as to give a spinel powder in the form of fine grains having a low cohesiveness and a low crystallinity.

The "water-soluble magnesium salt" and the "water-soluble aluminum salt" employed here as the starting materials include chlorides, sulfates and nitrates of magnesium or aluminum, and acetate, carbonate and oxalate of magnesium, etc. It is disclosed that chlorides are preferably employed therefor, since they are available in a highly pure state and compounds contaminating the hydroxide precipitate can be easily washed away in this case.

As techniques for producing catalysts, on the other hand, it is known to form a catalytic layer on the surface of a catalytic base material, for example, a honeycomb construction by preparing a slurry containing a noble metal and a powdery support such as a spinel powder and an alumina powder, and applying this slurry onto the catalytic base material (see, JP-A-3-131343, JP-A-7-328454, JP-A-10-99698).

Recently, exhaust controls become more and more strict. With an increase in the regulation level, it has been required to achieve an enhanced catalytic activity. Although the spinel powder obtained by the above-described coprecipitation method has a low cohesiveness, a low crystallinity and a high purity, a catalyst with the use of this spinel powder as a support cannot achieve a satisfactory catalytic activity, thus failing to satisfy the above requirement.

When a slurry containing a catalytic support is applied onto a catalytic base material in the catalyst-producing technique as described above, it is required that the slurry can be easily applied on and form a catalytic layer scarcely peeling off and being free from cracking.

SUMMARY OF THE INVENTION

The present invention has been completed to satisfy the above requirements.

The first object of the present invention is to provide an $MgAl_2O_4$ spinel powder which makes it possible, when employed as a catalytic support, to give a catalyst being excellent in catalytic activity, in particular, $NO_x$-reduction performance when used as an $NO_x$ storage-reduction catalyst support.

The second object of the present invention is to provide a slurry containing the above-described spinel powder which can form a coating layer scarcely peeling off and being free from cracking and which can be easily applied onto a catalytic base material such as a honeycomb construction to form a catalyst having excellent catalytic activity, in particular, $NO_x$-reduction performance achieved when used as a storage-reduction catalyst support.

As a result of eager studies, the present inventors have found the above first object of the present invention can be achieved by the following.

(1) A spinel powder represented by a chemical formula $MgAl_2O_4$, wherein the spinel powder has a specific surface area of 40 $m^2/g$ or more, and the average diameter of the spinel powder ranges from 3 to 20 $\mu m$.

(2) A spinel powder represented by a chemical formula $MgAl_2O_4$, produced by the process of drying a mixture solution containing a water-soluble organic substance having a boiling point of 120° C. or above, converting the dried substance into a complex oxide by heating and then milling, wherein the spinel powder has a specific surface area of 55 $m^2/g$ or more and an average diameter of from 3 to 20 $\mu m$.

(3) A spinel powder represented by a chemical formula $MgAl_2O_4$, produced by the process of drying a solution containing an aluminum salt of a water-soluble carboxylic acid and a magnesium salt of a water-soluble carboxylic acid and converting the dried substance into a complex oxide by heating, wherein the spinel powder has a specific surface area of 55 $m^2/g$ or more and an average diameter of from 3 to 20 $\mu m$.

(4) A spinel powder comprising $MgAl_2O_4$ as a main component produced by the process of mechanically mixing and milling a mixture of hydroxides for producing a spinel powder to convert into a complex hydroxide, heating a mixture composition of the obtained complex hydroxide and an unconverted hydroxide to convert into a complex oxide, wherein the spinel powder has a specific surface area of 42 $m^2/g$ or more and an average diameter of from 3 to 20 $\mu m$.

Further, the present inventors have found the above second object of the present invention can be achieved by a slurry comprising the above spinel powder.

DETAILED DESCRIPTION OF THE INVENTION

As the technical constitution for achieving the first object as described above, the spinel powder according to the first embodiment of the present invention is a spinel powder represented by a chemical formula $MgAl_2O_4$, wherein the spinel powder has a specific surface area of 40 m$^2$/g or more, and the average diameter of the spinel powder ranges from 3 to 20 μm.

The term "average diameter" as used herein means the median in the grain size distribution based on the weight of grains which is obtained by using a LASER SCATTERING PARTICLE SIZE DISTRIBUTION ANALYZER LA-910, manufactured by Horiba in accordance with Japanese industrial standards (JIS R-1629).

The technical significance of the fact that the spinel powder according to the first embodiment of the present invention has a "specific surface area of 40 m$^2$/g or more" is as follows. When the specific surface area is less than this value, the noble metal and other storage ingredients cannot be sufficiently dispersed for achieving the catalytic activity required. In this case, therefore, the catalytic activity desired in the present invention can be hardly established.

The technical significance of the fact that the spinel powder according to the first embodiment of the present invention has an "average diameter of from 3 to 20 μm" is as follows. When a spinel powder having an average diameter less than 3 μm is processed into a pelletized catalyst (i.e., the spinel powder is processed into a slurry which is not applied to a catalytic base material but dried alone to give a pelletized slurry), only a poor catalytic activity can be obtained due to the insufficient pores between grains constituting the pellets. When the average diameter of the spinel powder exceeds 20 μm in this case, on the contrary, the obtained pellets have a poor strength and are easily disintegrated.

On the other hand, when a spinel powder having an average diameter less than 3 μm is processed into a slurry and then employed as a coating to be applied onto a catalytic base material, for example, a honeycomb construction, the coating layer undergoes significantly large drying shrinkage and thus frequently suffers from cracking. In this case, moreover, the coating layer is liable to peel off under the conditions for the utilization as a catalyst. When the average diameter of the spinel powder exceeds 20 μm in this case, on the contrary, the dilatancy of the slurry is elevated and thus the fluidity is worsened in coating, which makes it difficult to apply the slurry uniformly onto the catalytic base material.

In the present invention, the average diameter of spinel powder is from 3 to 20 μm, preferably from 5 to 15 μm for the above reasons.

In the first embodiment of the present invention, the specific surface area of the spinel powder is preferably 80 m$^2$/g or more. Thus, the noble metal and other storage ingredients can be well dispersed and thus an improved catalytic activity can be obtained. Although the above-described functional effect is improved with an increase in the specific surface area, an excessively large specific surface area might result in a poor strength and a poor heat-resistance. It is also unfavorable from an economical viewpoint to excessively enlarge the specific surface area. From these points of view, it is preferable that the specific surface area is not more than 200 m$^2$/g.

The spinel powder according to the first embodiment of the present invention preferably has pores, at least 70% total pore volume of the spinel powder is within a range of d±d/2 from a mean pore diameter d, as determined from a maximum peak in a pore size distribution curve and the diameter d is of 5 nm<d<50 nm.

The "pore size distribution curve" means a curve drawn, for example, by plotting a value (dv/dD) obtained by differentiating the pore volume (V) with respect to the pore diameter (D). The pore diameter at the point at which the value dv/dD of the pore size distribution curve is largest (maximum peak) is called the mean pore diameter.

By using the spinel powder having uniform pore diameter as defined above as the support of a storage-reduction catalyst, the storage ingredient can be held in a uniformly dispersed state and the effective interaction thereof with a noble metal is ensured, thus achieving favorable NO$_x$ reduction performance.

The spinel powder according to the first embodiment of the present invention is obtained by the method specified as follows:

synthesizing with the use of hydroxide materials and calcining;

using aluminum hydroxide and magnesium hydroxide as the above-described hydroxide materials, i.e., synthesizing a spinel powder with the use of an aluminum salt prepared by dissolving aluminum hydroxide in an acid and a magnesium salt prepared by dissolving magnesium hydroxide in an acid and calcining and milling the thus obtained spinel powder;

synthesizing with the use of hydroxide materials wherein the ratio of the average diameter of the above-described aluminum hydroxide "$D_1$" to the average diameter of the above-described magnesium hydroxide "$D_2$" is $1.85 \leq (D_1/D_2)$ or $0.5 > (D_1/D_2)$ and calcining; and the above-described synthesizing means being the coprecipitation method.

Use of this powder as a support of a storage-reduction catalyst makes it possible to provide a catalyst having particularly excellent NO$_x$ reduction performance.

Next, the spinel powder according to the second embodiment of the present invention is a spinel powder represented by a chemical formula $MgAl_2O_4$, produced by the process of drying a mixture solution containing a water-soluble organic substance having a boiling point of 120° C. or above, converting the dried substance into a complex oxide by heating and then milling, wherein the spinel powder has a specific surface area of 55 m$^2$/g or more and an average diameter of from 3 to 20 μm. Still preferable embodiment thereof is characterized by:

the spinel powder being substantially free from a crystalline phase other than an $MgAl_2O_4$ spinel phase where the term "substantially free from" means "no crystalline phase other than the " $MgAl_2O_4$ spinel phase" can be identified in X-ray diffractometry";

the mixture solution for producing spinel being an aqueous solution of a mixture of a water-soluble inorganic aluminum salt with a water-soluble inorganic magnesium salt;

the water-soluble organic substance comprising at least one of monohydric alcohols, polyhydric alcohol monomers, dimers, trimers and oligomers each having a boiling point of 120° C. or above, water-soluble polymer compounds containing polymers of the polyhydric alcohols having a boiling point of 120° C. or above, monosaccharides, disaccharides, polysaccahrides, carbohydrates, carboxylic acids and salts thereof and surfactants; and the water-soluble polymer compounds comprising at least one of polyethylene glycol, polyacrylic acid and its derivatives, polyvinyl alcohol and its derivatives and cellulose and its derivatives.

According to the spinel powder of the second embodiment as described above, organic substance coexisting with the dried substance can be evaporated off or removed by oxidation simultaneously with the conversion of the dried substance into the spinel. This "evaporation or oxidation (thermal decomposition) of the organic substances" can promote the decomposition of the aluminum source and the magnesium source employed as the starting materials for producing the spinel and thus these materials can be converted into the complex oxide (i.e., the spinel) while being maintained in the state of the uniform mixture thereof, thus establishing a functional effect of giving a spinel free from a crystalline phase other than an $MgAl_2O_4$ spinel phase.

The spinel powder according to the third embodiment of the present invention is a spinel powder represented by a chemical formula $MgAl_2O_4$, produced by the process of drying a solution containing an aluminum salt of a water-soluble carboxylic acid and a magnesium salt of a water-soluble carboxylic acid and converting the dried substance into a complex oxide by heating, wherein the spinel powder has a specific surface area of 55 $m^2$/g or more and an average diameter of from 3 to 20 $\mu$m. A still preferable embodiment thereof is characterized by:

the spinel powder being substantially free from a crystalline phase other than an $MgAl_2O_4$ spinel phase where the term "substantially free from" means that "no crystalline phase other than the " $MgAl_2O_4$ spinel phase " can be identified in X-ray diffractometry"; and the carboxylic acid being one of $R_1COOH$, $R_2(COOH)_2$ and $R_3(COOH)_3$, wherein $R_1$ represents an alkyl group having 0 to 10 carbon atoms; $R_2$ represents an alkyl group having 0 to 10 carbon atoms; and $R_3$ represents an alkyl group having 1 to 10 carbon atoms.

This spinel powder of the third embodiment can exert the functional effect similar to the one of the second embodiment as described above.

Further, the spinel powder according to the fourth embodiment of the present invention is a spinel powder comprising $MgAl_2O_4$ as a main component produced by the process of mechanically mixing and milling a mixture of hydroxides for producing a spinel powder to convert into a complex hydroxide, heating a mixture composition of the obtained complex hydroxide and an unconverted hydroxide to convert into a complex oxide, wherein the spinel powder has a specific surface area of 42 $m^2$/g or more and an average diameter of from 3 to 20 $\mu$m. A still preferable thereof is characterized by:

the mixture composition containing a complex hydroxide and an unconverted hydroxide, the complec hydroxide having 80% by weight or more of grains with a grain diameter of 500 nm or less, preferably 100 nm or less;

the complex hydroxides contained in said mixture composition being a water-containing salt;

the complex hydroxide contained in said mixture composition containing at least one member selected from among $MgAl_2(OH)_8$, $Mg_4Al_2(OH)_{14} \cdot 3H_2O$ and $Mg_2Al(OH)_{10} \cdot xH_2O$;

the Mg/Al molar ratio in the complex hydroxide contained in the mixture composition being 1/2, 2/1 or 3/1;

a medium-mixing mill being employed as a means for said mechanical mixing/milling; and the hydroxide for producing a spinel powder comprising magnesium hydroxide and aluminum hydroxide.

In the case of the spinel powder of the fourth embodiment of the present invention, sufficiently high energy is applied to the hydroxide mixture for producing a spinel powder so as to preliminarily convert a part of the mixture into a complex oxide (i.e., a spinel). Thus, the spinel can be easily formed by heating treatment at a low temperature (110° C. or below). The spinel powder obtained by the low-temperature heating treatment as described above contains the spinel as the main component, suffers from the formation of little oxides of the starting materials and undergoes uniform solid dissolution. In addition, a spinel powder having a large surface area can be obtained thereby.

On the other hand, the spinel slurry according to the present invention, which is another technical constitution achieving the second object as described above, is characterized by:

being a slurry which contains the spinel powder according to any of the first to fourth embodiments as described above;

the slurry further containing a binder component; and the binder component comprising a basic sol or solution. This slurry can be easily applied onto a catalytic base material, for example, a honeycomb construction to form a coating layer scarcely peeling off and being free from cracking. Moreover, use of the spinel slurry of the present invention makes it possible to give a storage-reduction catalyst excellent particularly in $NO_x$-reduction performance.

The present invention will be described in greater detail by reference to the following Examples.

<The First Embodiment of Spinel Powder According to the Present Invention>

In the first embodiment of the spinel powder according to the present invention, a precipitate of a complex hydroxide is formed by the synthesis method with coprecipitation (i.e., the coprecipitation method) by starting with hydroxide materials, thermally treating this precipitate to give an $MgAl_2O_4$ spinel powder and then milling it to give an average diameter of 3 to 20 $\mu$m.

More particularly speaking, an aluminum salt is prepared by dissolving aluminum hydroxide in an acid, and a magnesium salt is prepared by dissolving magnesium hydroxide in an acid. Then the pH of an aqueous solution of the mixture thereof is adjusted with an alkali to form a precipitate. Next, this precipitate is dried and calcined to thereby give an $MgAl_2O_4$ spinel powder which is then milled to give an average diameter of 3 to 20 $\mu$m.

As the pH-adjusting agent, an arbitrary alkali known per se which is commonly employed in the coprecipitation method can be used. It is preferable to use aqueous ammonia therefor, as in Examples which will be given hereinafter. The means for milling is not particularly restricted but may be an arbitrary one. The milling may be carried out under arbitrary conditions, so long as the $MgAl_2O_4$ spinel powder can be milled to give an average diameter of 3 to 20 $\mu$m thereby.

In a still preferable case of the first embodiment of the present invention, hydroxide materials is used wherein the ratio of the average diameter of aluminum hydroxide "$D_1$" to the average diameter of magnesium hydroxide "$D_2$" satisfies the requirement $1.85 < (D_1/D_2)$ or $0.5 > (D_1/D_2)$. Use of such hydroxide materials differing in grain size makes it possible to achieve a remarkable effect of improving the $NO_x$ reduction performance of an $NO_x$-storage reduction catalyst. However, it is to be understood that the present invention is not restricted to the scope of $D_1/D_2$ as defined above but involves those excluded from this scope.

<The Second Embodiment of the Spinel Powder According to the Present Invention>

In the second embodiment of the spinel powder according to the present invention, a "mixture solution (aqueous solution) for producing spinel" is prepared by using a water-soluble inorganic aluminum salt and a water-soluble inorganic magnesium salt as an aluminum source and a magnesium source respectively and adding to this mixture solution (aqueous solution) a water-soluble organic substance having a boiling point of 120° C. or above.

Next, this mixture aqueous solution is dried and the dried substance is heated and calcined, thus evaporating off or removed by oxidation the organic substance and, at the same time, converting the salts into a spinel (complex oxide).

Now, this second embodiment will be illustrated. First, a water-soluble inorganic aluminum salt and a water-soluble inorganic magnesium salt are dissolved in water. Then, a water-soluble organic substance having a boiling point of 120° C. or above, optionally in the form of an aqueous solution prepared by dissolving the organic substance in water, are added thereto to give a mixture solution (aqueous solution). The obtained mixture solution (aqueous solution) is heated at a drying temperature to thereby evaporate off the water, thus giving a dried substance containing the organic substance.

Subsequently, this dried substance is calcined by heating so as to decompose the organic substances. At the same time, the aluminum salt and the magnesium salt can be converted into a complex oxide to thereby give an $MgAl_2O_4$ spinel.

The above-described "dried substance containing an organic substance" obtained by heating the mixture solution (aqueous solution) at a drying temperature and thus evaporating the water to a certain degree is in the form of a solution in which the inorganic aluminum salt and the magnesium salt are dissolved or uniformly dispersed in the organic substance. By heating and calcining this solution, the decomposition of the aluminum salt and the magnesium salt is accelerated, as described above. Thus, these salts can be converted into a complex oxide (i.e., a spinel) while being maintained in the state of the uniform mixture thereof, thus establishing a functional effect of giving a spinel free from a crystalline phase other than an $MgAl_2O_4$ spinel phase.

Without the coexistence of these water-soluble organic substances, either the inorganic aluminum salt or the magnesium salt decomposes earlier than the other. Thus, the uniform mixture, at the atomic level, of these components in the aqueous solution falls into disorder and thus segregation arises. As a result, the spinel powder is contaminated with crystalline oxide phases other than the spinel phase.

In the second embodiment of the present invention, it is not preferable that water-soluble organic substances having a boiling point lower than 120° C. coexist. This is because, in such a case, these organic substances are evaporated with the evaporation of water in the drying step prior to the heating/calcining, which makes the coexistence thereof difficult. As a result, the above-described "dried substance containing organic substances" can be hardly obtained. When a monovalent alcohol, for example, 1-butanol having a boiling point of 117.3° C. (azeotropic temperature: 92.7° C.) is employed in the first embodiment, it is evaporated off together with water in the drying step because 1-butanol and water form a mixture having a low azeotropic temperature and thus cannot coexist with the dried substance. Thus, it is unusable therein.

The amount of the water-soluble organic substances having a boiling point lower than 120° C. to be added in the second embodiment varies depending on the type of the water-soluble organic substances employed. It is preferable to add 1 to 50% by weight of these water-soluble organic substances based on the total of the water-soluble inorganic aluminum salt and the water-soluble magnesium salt.

When the content of the water-soluble organic substances is less than 1% by weight, the dried substance contains insufficient amount of organic substances and thus the desired effect can be hardly established. When the content thereof exceeds 50% by weight, on the contrary, the calcining temperature is excessively elevated due to the combustion heat of the organic substances. It is also unfavorable in this case that the increase in amount of the starting materials, which would not contribute to the final product, results in an increase in the cost.

Examples of the water-soluble organic substances usable in the second embodiment include monohydric alcohols, polyhydric alcohol monomers, dimers, trimers and oligomers each having a boiling point of 120° C. or above, water-soluble polymer compounds containing polymers of the polyhydric alcohols having a boiling point of 120° C. or above, monosaccharides, disaccharides, polysaccahrides, carbohydrates, carboxylic acids and salts thereof and surfactants. Examples thereof are as follows.

Examples of monohydric alcohols:
    1-Pentanol (b.p.: 138.3° C.), 1-hexanol (b.p.: 157.9° C.), 1-heptanol (b.p.: 175.8° C.), 1-octanol (b.p.: 183° C.), 2-octanol (b.p.: 179.5° C.), monoethanolamine (b.p.: 171° C.), diethylene glycol monoethyl ether (b.p.: 218° C.), alkyl alcohols and aminoalkyl alcohols having up to 10 carbon atoms and isomers and derivatives thereof.

Examples of polyhydric alcohol monomers:
    Diethanolamine (b.p.: 217° C.), triethanolamine (b.p.: 277° C.), ethylene glycol (b.p.: 197.5° C.), propylene glycol (b.p.: 188.2° C.), glycerol (b.p.: 290° C.), 1,5-pentanediol (b.p.: 238° C.), and polyhydric alcohols wherein two or more hydroxyl groups (—OH) are bonded to an alkyl group having up to 10 carbon atoms.

Examples of polyhydric alcohol dimers:
    Diethylene glycol (b.p.: 245° C.), ethylenepropylene glycol, derivatives thereof, and dimers formed by condensing other dihydric alcohols.

Examples of polyhydric alcohol trimers:
    Triethylene glycol (b.p.: 278.3° C.), tripropylene glycol, derivatives thereof, and trimers formed by condensing other dihydric alcohols.

Examples of water-soluble polymer compounds:
    Polyethylene glycol, polyacrylic acid and derivatives thereof, polyvinyl alcohol and derivatives thereof, and cellulose and derivatives thereof.

Examples of monosaccharides, disaccharides, polysaccharides and carbohydrates:
    Sorbitol, dextrin, starch, glycogen, pentose, glucose, fructose, galactose, maltose, saccharose, lactose and mannose.

Examples of carboxylic acids and salts thereof:
    Citric acid, succinic acid, tartaric acid, malic acid, malonic acid, mannonic acid and salts thereof.

Examples of surfactants:
    Nonionic surfactants of alkylene oxide type, polyether type and polyester type.
    Anionic surfactants of fatty acid type, α-sulfofatty acid ester salt type, linear alkyl benzene type, alkyl benzenesulfonate type, higher alcohol type, alkyl sulfate type, alkyl polyoxyethylene sulfate type, monoalkyl phosphate type, α-olefin type, and α-olefin sulfonate type.
    Cationic surfactants such as chlorides or acetates of monoalkylammoniums, dialkylammoniums and trialkylammoniums.

As the water-soluble inorganic aluminum salt and the water-soluble inorganic magnesium salt to be employed in the second embodiment, use may be arbitrarily made of water-soluble inorganic salts commonly employed such as nitrates, hydrochlorides and sulfates.

<The Third Embodiment of the Spinel According to the Present Invention>

In the case of the third embodiment of the spinel powder according to the present invention, a "mixture solution (aqueous solution) for producing spinel" is prepared by using an aluminum salt of a water-soluble carboxylic acid which is an organic compound having carboxyl group and a magnesium salt of a water-soluble carboxylic acid, respectively as the aluminum source and the magnesium source.

Similar to the second embodiment as described above, this mixture solution (aqueous solution) is dried and the resultant dried substance is heated and calcined. Thus the above-described carboxylic acids are removed by oxidation and, at the same time, the salts are converted into a spinel (i.e., a complex oxide).

Now, the third embodiment will be illustrated. First, the aluminum salt of a water-soluble carboxylic acid and the magnesium salt of a water-soluble carboxylic acid are dissolved in water to give a mixture solution. Then, this mixture solution is dried and water is removed, thus giving a "dried substance containing organic substances". Subsequently, this dried substance is heated and calcined. Thus, the carboxylic acids are removed by oxidation and, at the same time, the aluminum salt and the magnesium salt are thermally decomposed and converted into the complex oxide, thereby giving the $MgAl_2O_4$ spinel.

In the third embodiment of the present invention, when the dried substance containing organic substances is heated and calcined, the carboxylic acids are removed by oxidation, similar to the second embodiment as described above. Thus, the decomposition of the aluminum salt and the magnesium salt is accelerated and these salts can be converted into a complex oxide (i.e., a spinel) while being maintained in the state of the uniform mixture thereof, thereby establishing a functional effect of giving a spinel free from a crystalline phase other than an $MgAl_2O_4$ spinel phase.

The carboxylic acids (organic compounds having carboxyl group) to be employed in the third embodiment include a monovalent carboxylic acid having a structure of $R_1COOH$ wherein $R_1$ represents an alkyl group having 0 to 10 carbon atoms; a divalent carboxylic acid having a structure of $R_2(COOH)_2$ wherein $R_2$ represents an alkyl group having 0 to 10 carbon atoms; and a trivalent carboxylic acid having a structure of $R_3(COOH)_3$ wherein $R_3$ represents an alkyl group having 1 to 10 carbon atoms.

More particularly, preferable examples of these carboxylic acid are as follows:

$R_1COOH$: formic acid, acetic acid, propionic acid and mannonic acid;

$R_2(COOH)_2$: oxalic acid, succinic acid, tartaric acid, malic acid and malonic acid; and $R_3(COOH)_3$: citric acid.

(Among all, it is preferable to use citric acid which is a trivalent carboxylic acid.)

<The Fourth Embodiment of the Spinel Powder According to the Present Invention>

In the fourth embodiment, the spinel powder is produced by the process where a mixture of hydroxides for producing a spinel powder (a mixture of magnesium hydroxide with aluminum hydroxide) is mechanically mixed and milled to thereby impart sufficient mechanical energy to the mixture, thereby converting a portion of the mixture into a complex hydroxide.

Subsequently, the thus obtained mixture composition containing the complex hydroxide and the unconverted hydroxides (i.e., a mixture composition containing magnesium hydroxide and/or aluminum hydroxide and magnesium/aluminum complex hydroxide) is converted into a spinel by heating to give a powder containing an $MgAl_2O_4$ spinel as the main component.

In the "mixing and milling" treatment carried out in the fourth embodiment, the hydroxides for producing a spinel powder is uniformly dispersed in a liquid such as water and mixed. Then the obtained mixture is milled by using a mill in which balls, rollers, rotors, etc. collide with each other under such conditions as applying to the milling medium an acceleration higher by 1.5 times or more, preferably 5 times or more, still preferably 20 times or more and still preferably 200 times or more than the acceleration of gravity. Thus, the hydroxides for producing a spinel powder is reacted and converted into the complex hydroxide.

A medium-mixing mill is suitable as the device to be used in the milling, though the present invention is not restricted thereto. Namely, an arbitrary device may be employed therefor, so long as a milling efficiency sufficient for the conversion into the complex hydroxide can be established thereby.

Two or more metal hydroxide powders can be reacted and converted into a complex hydroxide by applying adequate energy for a sufficient time with the use of, in addition to a medium-mixing mill, a device wherein balls are carried in a container and stirred by externally applying large energy to the container such as vibrating ball mill and planetary ball mill or a device provided with a container consisting of an inner cylinder and an outer one rotating in the opposite directions, thereby stirring balls contained therein.

In a ball mill of the conventional type wherein a pot containing balls rotates, milling should be performed for along time so as to adjust the grain size of the hydroxide powder to the fevorable size. That is to say, the milling is carried out preferably for 25 hours or longer, still preferably 100 hours or longer.

During the milling step with the use of the above-described mill, fine hydroxide grains are formed and, moreover, the surface roughness of the hydroxide grains are increased and the crystalline structure thereof is distorted due to the impact applied by the milling medium. As a result, there arise additional effects of enhancing the reactivity and thoroughly mixing the hydroxides.

On the other hand, it is unavoidable that the mixture is contaminated with the milling medium. It is therefore necessary to select the milling medium material by taking the composition of the "hydroxide mixture composition", the utilization of the "complex oxide" obtained from the mixture composition, etc. into consideration.

The "hydroxide mixture composition" thus obtained contains the complex hydroxide (i.e., the conversion product obtained from the hydroxide mixture for producing a spinel powder) and the unconverted metal hydroxides in a uniformly mixed state. In the unconverted metal hydroxides which are mixed with the above-described complex hydroxide, 80% by weight or more of grains have a grain diameter of 500 nm or less, preferably 100 nm or less and still preferably 50 nm or less.

The content of the unconverted metal hydroxides can be reduced by mixing the hydroxides for producing a spinel powder as uniformly as possible and applying sufficient mechanical energy to the obtained mixture.

The "hydroxide mixture composition" thus obtained is then subjected to a heat treatment (i.e., heating at 1100° C. or lower) to give a uniform "complex oxide", namely, a "complex oxide (spinel)" suffering from little segregation of oxides originating in the unconverted hydroxides having a large specific surface area.

Next, the present invention will be described in greater detail by reference to an example wherein aluminum hydroxide and magnesium hydroxide are employed as the hydroxides for producing a spinel powder.

A. [Milling by using medium-mixing mill]

An aluminum hydroxide powder and a magnesium hydroxide powder are dispersed together in water to give a slurry. Then the aluminum hydroxide is reacted with the magnesium hydroxide by milling together with a medium-mixing mill while applying to the milling medium an acceleration 200 times or more as much as the acceleration of gravity (i.e., the milling is performed until 80% by weight or more the individual grains attain a diameter of 100 nm or less), thus giving a complex hydroxide.

Next, the "hydroxide mixture composition" contained the complex hydroxide obtained as the conversion product is dried to thereby remove water therefrom. Then it is heated at a temperature of 1100° C. or lower to give an $MgAl_2O_4$ spinel.

In the milling with the use of the medium-mixing mill, an acceleration 5 times or more, preferably 20 time or more and still preferably 200 times or more as much as the acceleration of gravity is applied to the milling medium so that, after the completion of the milling, 80% or more of the grains have diameter of 500 nm or less, preferably 100 nm or less.

Although $Al(OH)_3$ is commonly known as the starting aluminum hydroxide, it is also possible to use AlOOH or hydrated salts thereof. Similarly, the magnesium hydroxide may be an appropriate one regardless of the crystalline structure of the presence of crystal water.

As the complex hydroxide, the conversion may be made into any anhydrous salt or hydrated salt having an Mg/Al molar ratio "ranging from 0.5 to 3". When the Mg/Al molar ratio of the converted complex hydroxide crystals exceeds the Mg/Al molar ratio of the starting materials, the coexisting $Al(OH)_3$ should contain 80% by weight or more of grains having grain diameter of 100 nm or less. It is still preferable that the $Al(OH)_3$ coexists with the complex hydroxide or $Mg(OH)_2$ within each grain.

When the Mg/Al molar ratio of the converted complex hydroxide crystals is lower than the Mg/Al ratio of the starting materials, on the contrary, the coexisting $Mg(OH)_2$ should contain 80% by weight or more of grains having grain diameter of 100 nm or less. It is still preferable that the $Mg(OH)_2$ coexists with the complex hydroxide or $Al(OH)_3$ within each grain.

In the "hydroxide mixture composition" to be used for producing spinel, $Al(OH)_3$ or $Mg(OH)_2$ coexisting with the complex hydroxide has been finely milled so that 80% by weight or more of the grains have grain diameter of 100 nm before mixing.

On the other hand, it is unavoidable that the mixture is contaminated with the milling medium. It is therefore necessary to select the milling medium material by taking the composition of the "hydroxide mixture composition", the utilization of the "complex oxide" obtained from the mixture composition, etc. into consideration. Since a milling medium made of 3% $Y_2O_3$—$ZrO_2$ is employed herein, a 3% $Y_2O_3$—$ZrO_2$ powder coexists therewith.

Figure 2:
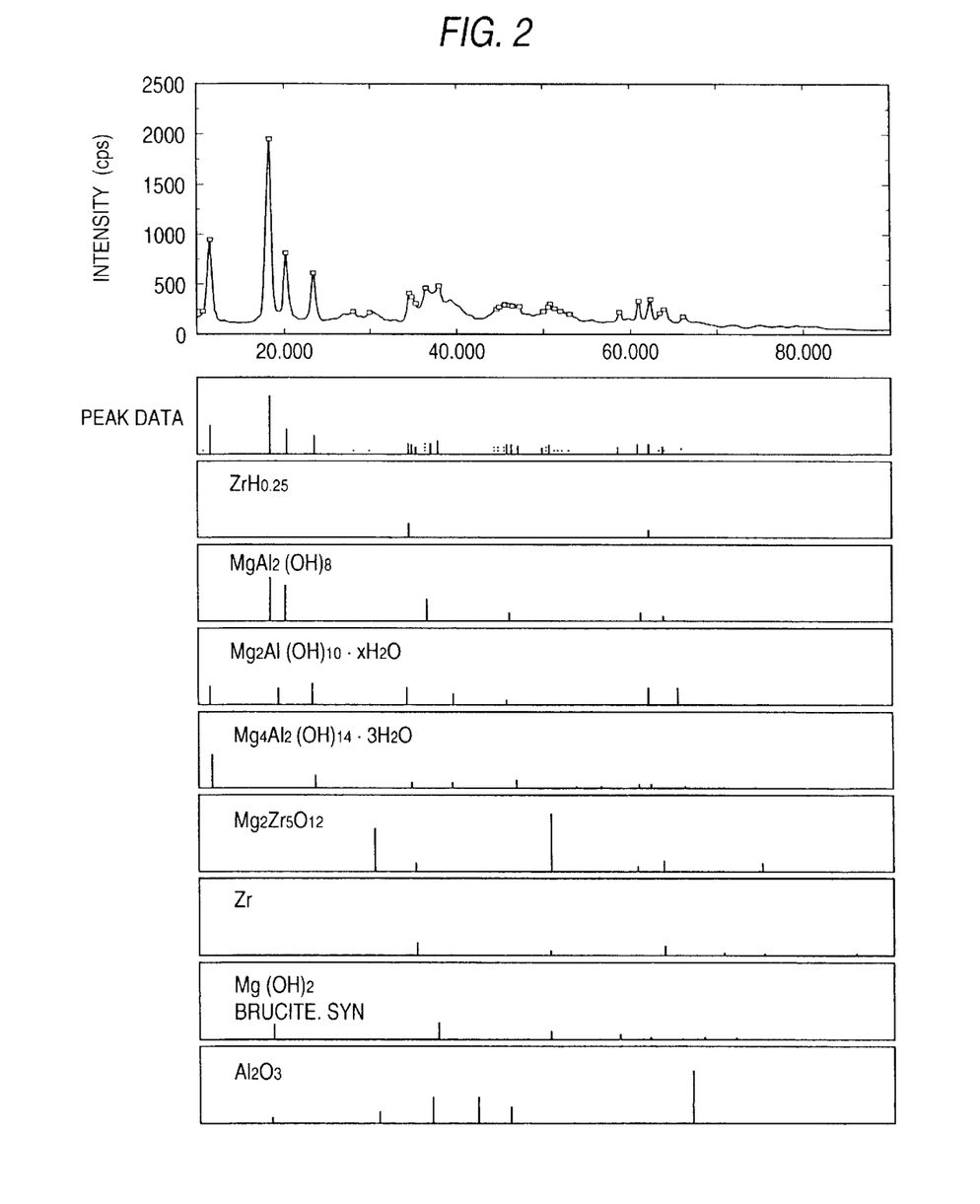
FIG. 2 is an X-ray diffraction pattern of the hydroxide mixture composition in the fourth embodiment of the present invention.

FIG. 2 is an X-ray diffraction pattern of the mixture composition employed for obtaining an $MgAl_2O_4$ spinel in the fourth embodiment of the present invention wherein an Mg/Al complex hydroxide composed of $MgAl_2(OH)_8$, $Mg_4Al_2(OH)_{14} \cdot 3H_2O$ or $Mg_2Al(OH)_{10} \cdot xH_2O$ is mixed with $Al(OH)_3$, each having a grain diameter of 100 nm or less.

Figure 3:
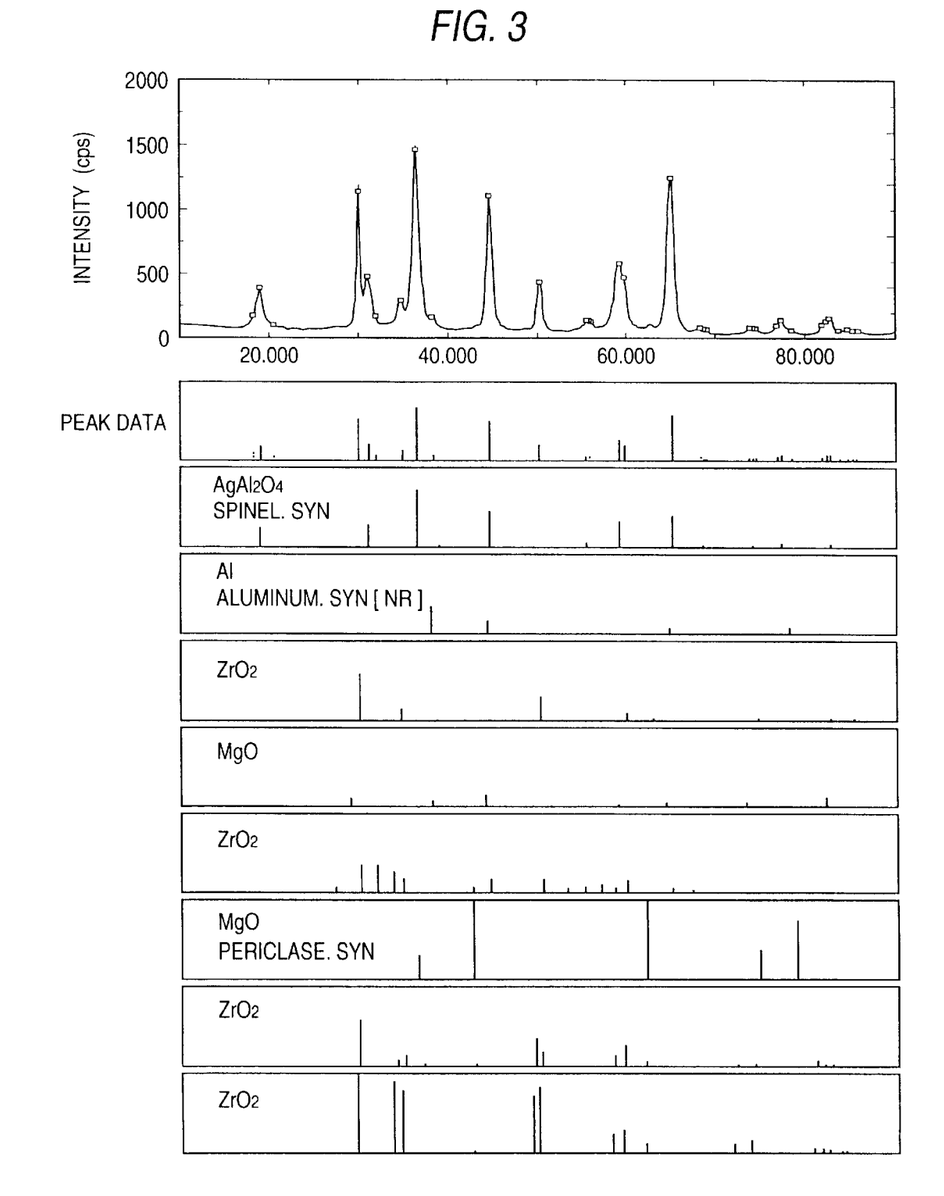
FIG. 3 is an X-ray diffraction pattern of the composite oxide in the fourth embodiment of the present invention.

FIG. 3 is an X-ray diffraction pattern of $MgAl_2O_4$ obtained by further calcining the mixture composition at 1,000° C. for 5 hours.

As FIG. 2 shows, the hydroxide mixture composition of the present invention is a mixture composition of plural hydroxides and a complex hydroxide. Also, FIG. 3 clearly indicates that a magnesium aluminate spinel having a stoichiometric composition containing aluminum and magnesium at a proper ratio can be obtained by heating the hydroxide mixture composition of the present invention.

Since the $MgAl_2O_4$ spinel can be easily formed by heating the above-described mixture composition at a temperature of 1100° C. or lower, it is little contaminated with $Al_2O_3$, MgO or both of the same. Thus, an $MgAl_2O_4$ spinel showing uniform solid dissolution of Al and Mg and having a large specific surface area can be obtained. The mechanism thereof is seemingly as follows.

To form a uniform of $MgAl_2O_4$ spinel (i.e., an $MgAl_2O_4$ spinel having the same Al/Mg ratio as that of the starting materials), it is an important factor how to uniformly mix the Al component with the Mg component. In the present invention, a "hydroxide mixture composition" containing a complex hydroxide carrying both of Mg and Al is employed as the starting material, which makes it possible to prevent the segregation of MgO.

Since the above-described complex hydroxide has an Mg/Al molar ratio of 2/1, the Al component should be further added to give an $MgAl_2O_4$ spinel. As an Al source, it is a practice to use $Al(OH)_3$ having a high reactivity. However, AlOOH is usable therefor in some cases.

The "hydroxide mixture composition" to be used in the present invention can be obtained by mechanically milling a mixture of $Al(OH)_3$ with $Mg(OH)_2$. By applying mechanically sufficient energy thereto, an Mg/Al complex hydroxide can be formed and, at the same time, $Al(OH)_3$ and the Mg/Al complex hydroxide can be mixed in the state of fine grains.

In the "hydroxide mixture composition", the Mg/Al complex hydroxide composed of $MgAl_2(OH)_8$, $Mg_4Al_2(OH)_{14} \cdot 3H_2O$ or $MgAl_2(OH)_{10} \cdot xH_2O$ is mixed with $Al(OH)_3$, under the condition that 80% by weight or more the grains have diameter of 100 nm or less. Therefore, these components have high reactivity and the segregation of $Al_2O_3$ can be prevented.

B. [Milling by using ball mill]

An aluminum hydroxide powder and a magnesium hydroxide powder are dispersed together in water to give a slurry. Then the aluminum hydroxide is reacted with the magnesium hydroxide by milling together with a mill wherein the slurry is milled by rotating together with balls in a milling container for a long time while applying to the milling medium an acceleration 1 to 2 times as much as the acceleration of gravity (i.e., the milling is performed until 80% by weight or more the individual grains attain a diameter of 500 nm or less), thus converting it into a complex hydroxide.

Next, the "hydroxide mixture composition" contained the complex hydroxide obtained as the conversion product is dried to thereby remove water therefrom. Then it is heated at a temperature of 1100° C. or lower to give an $MgAl_2O_4$ spinel.

Although the effect established by the milling process with the use of this milling container is inferior to the one obtained by using a medium-mixing mill, fine hydroxide grains are formed thereby and, moreover, the surface roughness of the hydroxide grains are elevated and the crystalline structure thereof is distorted due to the impact applied by the milling medium to thereby increase the reactivity. As a result, these components can be adequately mixed together and the grains are fused, either partly or totally, with each other and thus converted into the complex hydroxide.

When the Mg/Al ratio of the starting materials is 1:2, as a result, an $MgAl_2O_4$ spinel can be thus easily prepared, though it cannot be obtained from such a low temperature as in the case with the use of the medium-mixing mill as described above. In the obtained complex oxide powder, namely, about 90% or more (quantitatively analyzed by powder X-ray diffractometry, hereinafter referred to simply as XRD) and about 99% or more (by XRD) grains are converted into $MgAl_2O_4$ spinel respectively at 800° C. and 1,000° C. and no crystal but MgO is identified other than the spinel.

The treatment with the ball mill is performed while applying to the milling medium an acceleration 1.5 times or more (preferably 5 times or more and still preferably 20 times or more) as much as the acceleration of gravity. The milling is performed until 80% by weight or more the grains attain a diameter of 500 nm or less, preferably 200 nm or less.

Figure 4:
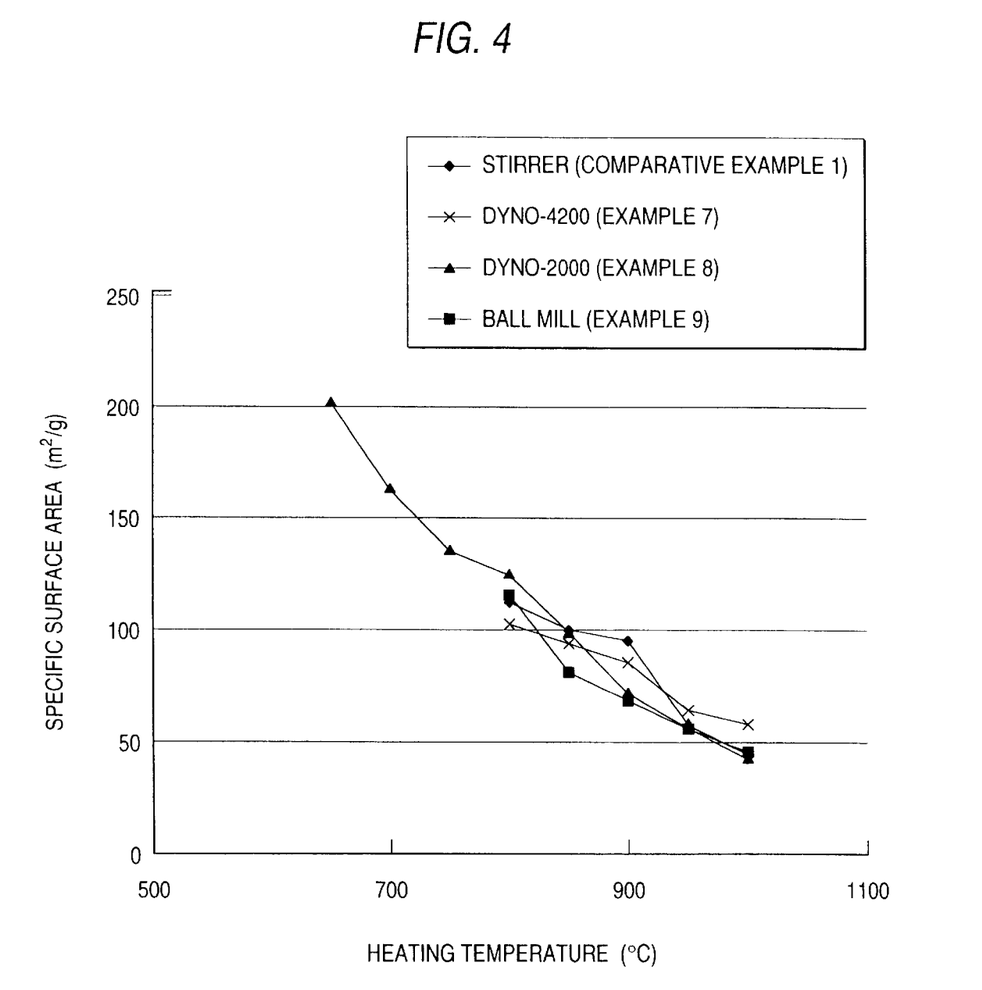
FIG. 4 is a graph which shows relationships between the heat treatment temperature and specific surface area of the hydroxide mixture composition in the fourth embodiment of the present invention and those of a conventional hydroxide mixture.

FIG. 4 is a graph which shows relationships between the heat treatment temperature and specific surface area of $MgAl_2O_4$ spinel powders.

As FIG. 4 shows, in each of the composition obtained by merely stirring with a stirrer in water without applying any milling energy as in the conventional method (COMPARATIVE EXAMPLE 1) and the "hydroxide mixture compositions" according to the present invention and the complex oxide powders with the use of the same (EXAMPLES 7 to 9), a large specific surface area of 42 to 57 $m^2/g$ can be obtained by heating at about 1,000° C.

In the case of the conventional method, however, the $MgAl_2O_4$ spinel can be formed only at a low yield. When heated at a high temperature (1,200 to 1,400° C.) to obtain a powder with a high $MgAl_2O_4$ spinel content, then the specific surface area is reduced to 2 to 7 $m^2/g$. In the fourth embodiment of the present invention, in contrast thereto, a powder with a sufficiently high $MgAl_2O_4$ spinel content can be obtained by heating at about 1,000° C.

Thus, it can be understood that the fourth embodiment of the present invention provides a means appropriate for obtaining a powder having a large specific surface area and a high $MgAl_2O_4$ spinel content.

When aluminum hydroxide and magnesium hydroxide are mixed and heated at a temperature of 1100° C. or lower in accordance with the conventional method, an $MgAl_2O_4$ spinel is formed only a lower ratio than in the fourth embodiment of the present invention. In the former case, it is also unfavorable that the $MgAl_2O_4$ spinel is contaminated with both of $Al_2O_3$ and MgO.

(Embodiment of Spinel Powder in Accordance with the Present Invention)

The embodiment of the spinel slurry according to the present invention is a spinel slurry containing a spinel powder according to the present invention as described above (i.e., any of the spinel powders of the first to fourth embodiments), without particular restriction. It is preferable that the content of the spinel powder in the spinel slurry expressed in the non-volatile solid content (Nv) is from 25 to 45%.

This is because when the non-volatile solid content (Nv) is less than 25%, a coating film undergoes serious drying shrinkage and thus a coating film having a generally employed thickness (several ten $\mu$m or more) frequently suffers from cracking. In this case, moreover, only a small amount of the coating can be used in a single coating operation and thus it becomes necessary to repeat the coating operation to give an adequate coating dose. When the non-volatile solid content (Nv) is exceeds 45%, on the other hand, the slurry becomes excessively viscous and can be hardly applied.

In a preferable embodiment of the present invention, the above-described slurry further contains a binder component. The addition of the binder component brings about an advantage that when the slurry is applied onto, for example, a honeycomb construction, the adhesion properties of the spinel powder to the honeycomb construction are improved and thus separation (peel-off) can be prevented.

As the binder component, use may be preferably made of a basic sol or solution, more particularly, a magnesia/alumina spinel sol or a zirconia sol.

It is preferable that the solid binder components remaining after the completion of the drying and calcining amount to 3 to 15% based on the total solid content of the coating film. When the content thereof is less than 3%, grains in the coating film cannot be sufficiently bonded to each other. In this case, it is feared that these grains would be scattered when exposed to a high wind pressure. It is also unfavorable that the content thereof exceeds 15%, since the inherent characteristics of the spinel powder per se as an $NO_x$ storage-reduction catalyst support are deteriorated thereby.

The spinel powder and the spinel slurry according to the present invention are appropriate as a support of catalysts, for example, $NO_x$ storage-reduction catalysts and ternary catalysts. When employed as the support of an $NO_x$ storage-reduction catalyst, in particular, it can provide a catalyst having excellent $NO_x$ reduction performance.

EXAMPLES

The present invention will be described in greater detail by reference to examples of the spinel powder and the spinel slurry according to the present invention, but it should be understood that the invention is not construed as being limited to the following Examples 1 to 11.

The following Examples 1 to 4 relate to the first embodiment of the present invention. In each of these Examples, hydroxide materials (magnesium hydroxide and aluminum hydroxide) were employed and a precipitate was formed by the coprecipitation method. Then the precipitate was heated to give an $MgAl_2O_4$ spinel powder which was then milled to give a desired average diameter.

As the magnesium hydroxide, use was made of the following marketed products:
"SP" manufactured by Naikai Engyo K.K.: large grain diameter (average diameter: 3.1 $\mu$m); and
"MS-4" manufactured by Tomita Pharmaceutical K.K.: small grain diameter (average diameter: 0.54 $\mu$m).
As the aluminum hydroxide, on the other hand, use was made of the following marketed products:
"H-WP" manufactured by Showa Denko K.K.: large grain diameter (average diameter: 12.8 $\mu$m); and
"C-301" manufactured by Sumitomo Chemical Co., Ltd.: small grain diameter (average diameter: 1.0 $\mu$m).
The "acetic acid" employed in the "preparation of aqueous magnesium solution" and the "nitric acid" employed in the "preparation of aqueous aluminum solution" were each a product of Wako Pure Chemical Industries, Ltd.

EXAMPLE 1

In this Example, use was made as magnesium hydroxide of a hydroxide material having a large grain diameter (average diameter: 3.1 µm, i.e., "SP" manufactured by Naikai Engyo K.K. as described above). As aluminum hydroxide, on the other hand, one having a small grain diameter (average diameter: 1.0 µm, i.e., "C-301" manufactured by Sumitomo Chemical Co., Ltd. as described above) was employed.

In this Example, the ratio of the average diameter of aluminum hydroxide "$D_1$" to the average diameter of magnesium hydroxide "$D_2$" ($D_1/D_2$) was adjusted to 0.32.

Preparation of Aqueous Magnesium Solution:

11.6 g of the magnesium hydroxide having a large grain diameter ("SP" manufactured by Naikai Engyo K.K. as described above) was dissolved in an aqueous acetic acid solution (prepared by diluting 12 g of acetic acid with 100 g of water) by stirring with a magnetic stirrer to thereby give an aqueous magnesium solution containing 0.2 mol of $Mg^{2+}$ ion.

Preparation of Aqueous Aluminum Solution:

31.2 g of the aluminum hydroxide having a small grain diameter ("C-301" manufactured by Sumitomo Chemical Co., Ltd. as described above) was dissolved in an aqueous nitric acid solution (prepared by further diluting 108 g of a 70% aqueous solution of nitric acid with 100 g of water) to thereby give an aqueous aluminum solution containing 0.4 mol of $Al^{3+}$ ion. This operation was carried out at a high temperature under elevated pressure (120° C., 2 atm) to thereby accelerate the dissolution.

Preparation of Spinel Powder:

The aqueous magnesium solution and the aqueous aluminum solution thus prepared were mixed by using a 3 l glass beaker. Then 240 g of a 25% aqueous ammonia solution was added thereto to give a white precipitate. This white precipitate, as being contained in the beaker, was introduced into a hot-air dryer and dried at 150° C. for 10 hours. Next, the temperature was elevated to 400° C. at a speed of 50° C./h and then the dried substance was pre-calcined at 400° C. for 5 hours. The powder thus obtained was transferred into a crucible and calcined at 850° C. for 5 hours to thereby give an $MgAl_2O_4$ spinel powder.

Preparation of Spinel Slurry:

The spinel powder thus obtained was dispersed in water (non-volatile solid content (Nv): 35%) and then milled to thereby give a slurry containing the $MgAl_2O_4$ spinel powder (average diameter: 12 µm).

This spinel powder had a specific surface area of 80 $m^2/g$. This spinel powder had a mean pore diameter (d) of 15 nm and the pores thereof were regular in size, i.e., 85% of the total pore volume falling within a range of d±d/2.

EXAMPLE 2

In this Example, use was made as magnesium hydroxide of a hydroxide material having a small grain diameter (average diameter: 0.54 µm, i.e., "MS-4" manufactured by Tomita Pharmaceutical K.K. as described above). As aluminum hydroxide, on the other hand, one having a large grain diameter (average diameter: 12.8 µm, i.e., "H-WP" manufactured by Showa Denko K.K. as described above) was employed. (The ratio of the average diameter of aluminum hydroxide "$D_1$" to the average diameter of magnesium hydroxide "$D_2$" ($D_1/D_2$) was 23.7.)

Except the above factors, an $MgAl_2O_4$ spinel powder and a spinel slurry containing the spinel powder having an average diameter of 11 µm were prepared as in the above Example 1.

This spinel powder had a specific surface area of 82 $m^2/g$. This spinel powder had a mean pore diameter (d) of 13 nm and the pores thereof were regular in size, i.e., 80% of the total pore volume falling within a range of d±d/2.

EXAMPLE 3

In this Example, use was made as magnesium hydroxide and aluminum hydroxide of hydroxide materials having a small grain diameter (i.e., "MS-4" manufactured by Tomita Pharmaceutical K.K. as described above and "C-301" manufactured by Sumitomo Chemical Co., Ltd. as described above). (The ratio of the average diameter of aluminum hydroxide "$D_1$" to the average diameter of magnesium hydroxide "$D_2$" ($D_1/D_2$) was 1.85.)

Except the above factors, a spinel powder and a spinel slurry containing the spinel powder having an average diameter of 11 µm were prepared as in the above Example 1.

This spinel powder had a specific surface area of 126 $m^2/g$. This spinel powder had a mean pore diameter (d) of 14 nm and the pores thereof were regular in size, i.e., 70% of the total pore volume falling within a range of d±d/2.

EXAMPLE 4

In this Example, use was made as magnesium hydroxide and aluminum hydroxide of hydroxide materials having a large grain diameter (i.e., "SP" manufactured by Naikai Engyo K.K. as described above and "H-WP" manufactured by Showa Denko K.K. as described above). (The ratio of the average diameter of aluminum hydroxide "$D_1$" to the average diameter of magnesium hydroxide "$D_2$", ($D_1/D_2$) was 4.13.)

Except the above factors, a spinel powder and a spinel slurry containing the spinel powder having an average diameter of 10 µm were prepared as in the above Example 1.

This spinel powder had a specific surface area of 87 $m^2/g$. This spinel powder had a mean pore diameter (d) of 11 nm and the pores thereof were regular in size, i.e., 70% of the total pore volume falling within a range of d±d/2.

EXAMPLE 5

This Example relates to the second embodiment of the present invention.

0.2 mol of aluminum nitrate and 0.1 mol of magnesium nitrate were dissolved in 1 l of water in a glass baker. Next, 11.7 g of diethylene glycol (boiling point: 245° C.) was added thereto while stirring with a magnetic hot stirrer. Then stirring was continued to thereby give a mixture solution for producing spinel.

Then a heater was switched on and the above-described mixture solution contained in the beaker was stirred with a stirrer under heating until the water was evaporated. Subsequently, the stirrer was taken out from the beaker and the residue was calcined at 400° C. to give a white powder.

This white powder was transferred into an alumina crucible and calcined at 850° C. for 5 hours to thereby give an $MgAl_2O_4$ spinel powder having an Mg/Al molar ratio of 1/2. Next, this spinel powder was dispersed in water (non-volatile solid content (Nv): 35%) as in Example 1 to give a spinel slurry containing the $MgAl_2O_4$ spinel powder having an average diameter of 7 µm.

This spinel powder had a specific surface area of 68 $m^2/g$. This spinel powder had a mean pore diameter (d) of 16 nm and the pores thereof were regular in size, i.e., 70% of the total pore volume falling within a range of d±d/2. When analyzed by XRD, it contained no crystalline phase other than the $MgAl_2O_4$ spinel phase.

EXAMPLE 6

This Example relates to the third embodiment of the present invention.

0.2 mol of aluminum citrate and 0.1 mol of magnesium citrate were dissolved in 1 l of water in a glass baker to thereby give a mixture solution for producing spinel. Then the above-described mixture solution was stirred with a magnetic hot stirrer until the water was evaporated. Subsequently, the stirrer was taken out from the beaker and the residue was calcined at 400° C. to give a white powder.

This white powder was transferred into an alumina crucible and calcined at 850° C. for 5 hours to thereby give an $MgAl_2O_4$ spinel powder having an Mg/Al molar ratio of 1/2. Next, this spinel powder was dispersed in water (non-volatile solid content (Nv): 35%) as in Example 1 to give a spinel slurry containing the $MgAl_2O_4$ spinel powder having an average diameter of 9 $\mu$m.

This spinel powder had a specific surface area of 55 $m^2/g$. This spinel powder had a mean pore diameter (d) of 18 nm and the pores thereof were regular in size, i.e., 70% of the total pore volume falling within a range of d±d/2. When analyzed by XRD, it contained no crystalline phase other than the $MgAl_2O_4$ spinel phase.

The following Examples 7 to 11 relate to the fourth embodiment of the present invention.

EXAMPLE 7

An aluminum hydroxide powder having an average diameter of 17 $\mu$m and a magnesium hydroxide powder having an average diameter of 19 $\mu$m were mixed together to give an Mg/Al molar ratio of 1/2. 100 g of the resultant mixture was added to 2 l of water and dispersed therein by stirring with a propeller stirrer for 5 minutes.

Next, this dispersion was milled by using a medium-mixing mill (Dynomill) provided with a milling medium made of $ZrO_2$ at 4200 rpm for 20 hours (the acceleration applied to the milling medium being 760 times as much as the acceleration of gravity) thereby converting most of the aluminum hydroxide and most of the magnesium hydroxide into a crystalline complex hydroxide. Then, water was removed from the milled substance by drying at 150° C. for 10 hours to thereby give a powder. (Diameter of stirring blade 2R=7.7 cm. Rotation rate=4,200 rpm. Circumferential velocity V=π×7.7×4200/60=1693.3 cm/s. Circular motion acceleration α=$V^2$/R=744760.35 cm/s/s. Acceleration of gravity g=980.6 cm/s/s. Thus, α/g=759.49.)

By analyzing by XRD, it was clarified that the crystalline phases of this powder were composed of the following three complex hydroxides:

$MgAl_2(OH)_8$, $Mg_2Al(OH)_{10} \cdot xH_2O$ and $Mg_4Al_2(OH)_{14} \cdot 3H_2O$;

and a mixture of a small amount of $Mg(OH)_2$ and an unidentified phase. (No peak assignable to $ZrO_2$ contaminant from the $ZrO_2$ milling medium was detected.)

By analyzing the grain size distribution by the dynamic light scattering method, it was found out that 90% by weight or more of the grains of this powder had grain diameter of 100 nm or less.

Next, 50 g of this powder containing the complex hydroxide as the main component was transferred into an alumina crucible and heated at 1,000° C. for 5 hours to thereby give a spinel powder.

The spinel powder thus obtained was an $MgAl_2O_4$ spinel powder having an Mg/Al molar ratio of 1/2. Next, this spinel powder was dispersed in water (non-volatile solid content (Nv): 35%) as in Example 1 and milled to give a spinel slurry containing the $MgAl_2O_4$ spinel powder having an average diameter of 12 $\mu$m.

This spinel powder had a specific surface area of 57 $m^2/g$. This spinel powder had a mean pore diameter (d) of 18 nm and the pores thereof were regular in size, i.e., 70% of the total pore volume falling within a range of d±d/2. When analyzed by XRD, it contained about 10% by volume of a $ZrO_2$ powder seemingly contaminating due to the abrasion of the milling medium.

EXAMPLE 8

An aluminum hydroxide powder having an average diameter of 17 $\mu$m and a magnesium hydroxide powder having an average diameter of 19 $\mu$m were mixed together to give an Mg/Al molar ratio of 1/2. 100 g of the resultant mixture was added to 2 l of water and dispersed therein by stirring with a propeller stirrer for 5 minutes.

Next, this dispersion was milled by using a medium-mixing mill (Dynomill) provided with a milling medium made of $ZrO_2$ at 2,000 rpm for 20 hours (the acceleration applied to the milling medium being 172.1 times as much as the acceleration of gravity), thereby converting most of the aluminum hydroxide and most of the magnesium hydroxide into a crystalline complex hydroxide. Then, water was removed from the milled substance by drying at 150° C. for 10 hours to thereby give a powder.

(Diameter of stirring blade 2R=7.7 cm. Rotation rate=2,000 rpm. Circumferential velocity V=π×7.7×2000/60=806.1 cm/s. Circular motion acceleration α=$V^2$/R=168762.42 cm/s/s. Acceleration of gravity g=980.6 cm/s/s. Thus, α/g= 172.10.)

By analyzing by XRD, it was clarified that the crystalline phases of this powder were composed of the following three complex hydroxides:

$MgAl_2(OH)_8$, $Mg_2Al(OH)_{10} \cdot xH_2O$ and $Mg_4Al_2(OH)_{14} \cdot 3H_2O$;

and a mixture of a small amount of $Mg(OH)_2$ and an unidentified phase.

The contents of $Mg(OH)_2$ and the unidentified phase were larger than those in Example 7.

(No peak assignable to $ZrO_2$ contaminant from the $ZrO_2$ milling medium was detected.) By analyzing the grain size distribution by the dynamic light scattering method, it was found out that 80% by weight or more of the grains of this powder had grain diameter of 200 nm or less.

Next, 50 g of this powder containing the complex hydroxide as the main component was transferred into an alumina crucible and heated at 1,000° C. for 5 hours to thereby give a spinel powder.

The spinel powder thus obtained was an $MgAl_2O_1$ spinel powder having an Mg/Al molar ratio of 1/2. Next, this spinel powder was dispersed in water (non-volatile solid content (Nv): 35%) as in Example 1 and milled to give a spinel slurry containing the $MgAl_2O_4$ spinel powder having an average diameter of 11 $\mu$m.

This spinel powder had a specific surface area of 42 $m^2/g$. This spinel powder had a mean pore diameter (d) of 25 nm and the pores thereof were regular in size, i.e., 75% of the total pore volume falling within a range of d±d/2. When analyzed by XRD, it contained about 1% by volume of a $Zro_2$ powder seemingly contaminating due to the abrasion of the milling medium.

EXAMPLE 9

An aluminum hydroxide powder having an average diameter of 17 $\mu$m and a magnesium hydroxide powder having an average diameter of 19 μm were mixed together to give an Mg/Al molar ratio of 1/2. 100 g of the resultant mixture was added to 2 l of water and dispersed therein by stirring with a propeller stirrer for 5 minutes.

Next, 0.8 l of this dispersion was introduced into a $ZrO_2$ pot (internal volume: 4 l) packed with $ZrO_2$ balls (5 mm) to half the internal volume and milled at 120 rpm for 100 hours, thereby converting a part of the aluminum hydroxide and a part of the magnesium hydroxide into a crystalline complex hydroxide. In this step, the acceleration applied to the milling medium was about 1.6 times as much as the acceleration of gravity. Then, water was removed from the milled substance by drying at 150° C. for 10 hours to thereby give a powder. The diameter of the pot was 20 cm and the milling was performed at 120 rpm. Thus the acceleration was calculated as being 1.6 times as much as the acceleration of the gravity, in accordance with the following formulae.

The value "1.61 times as much as the acceleration of the gravity" was determined by exclusively considering the acceleration caused by the rotation of the pot. Since the pot rotated around a horizontal axis actually, the acceleration at the upper part of the pot amounted to 0.61 times as much as the acceleration of the gravity while that at the lower part of the pot amounted to 2.61 times as much as the same, thereby being 1.61 on average.

Circumferential velocity V=π×20×120/60=125.66 cm/s. Acceleration a=(125.66)²/10=1579. Thus, a/g=1579/980.6=1.61.

By analyzing by XRD, it was clarified that the crystalline phases of this powder were composed of aluminum hydroxide and magnesium hydroxide as the main component and a mixture of the following three complex hydroxides:

with a small amount an unidentified phase.

(No peak assignable to $ZrO_2$ contaminant from the $ZrO_2$ milling medium was detected.) By analyzing the grain size distribution by the dynamic light scattering method, it was found out that 80% by weight or more of the grains of this powder had grain diameter of 500 nm or less.

Next, 50 g of this powder containing the complex hydroxide as the main component was transferred into an alumina crucible and heated at 1,000° C. for 5 hours to thereby give a spinel powder.

The spinel powder thus obtained was an $MgAl_2O_4$ spinel powder having an Mg/Al molar ratio of 1/2. Next, this spinel powder was dispersed in water (non-volatile solid content (Nv): 35%) as in Example 1 and milled to give a spinel slurry containing the $MgAl_2O_4$ spinel powder having an average diameter of 14 μm.

This spinel powder had a specific surface area of 46 m²/g. This spinel powder had a mean pore diameter (d) of 21 nm and the pores thereof were regular in size, i.e., 70% of the total pore volume falling within a range of d±d/2. It was not contaminated with $ZrO_2$ powder formed by the abrasion of the milling medium.

EXAMPLE 10

An aluminum hydroxide powder having an average diameter of 17 μm and a magnesium hydroxide powder having an average diameter of 19 μm were mixed together to give an Mg/Al molar ratio of 1/2. 100 g of the resultant mixture was added to 2 l of water and dispersed therein by stirring with a propeller stirrer for 5 minutes.

Next, 250 ml of this dispersion was introduced into a $ZrO_2$ pot (internal volume: 500 ml) packed with $ZrO_2$ balls (3 mm) to 1/3 of the internal volume. After setting the planetary ball mill to graduation 10, milling was performed for 5 hours, thereby converting a part of the aluminum hydroxide and a part of the magnesium hydroxide into a crystalline complex hydroxide.

The rotation of the mill was stopped at intervals of 1 hour and the pot was cooled by blowing air thereto to thereby prevent the sample from being heated by the exothermic milling.

In this case, the acceleration applied to the milling medium was about 38.2 times as much as the acceleration of gravity. Then, water was removed from the milled substance by drying at 150° C. for 10 hours to thereby give a powder.

The acceleration was calculated as follows. Inner diameter of pot (2R)=12 cm. Circumferential velocity of pot spinning V (cm/s)=π×12(cm)×450(rpm)/60=282.7. Acceleration of spinning $a_1$=V²/R=(282.7)²/6=13323 (cm/s/s).

Inner diameter of rotating disc=34 cm. Circumferential velocity of pot revolution V' (cm/s)=π×34×360/60=640.87. Acceleration of revolution $a_2$=(640.87)²/17=24159 (cm/s/s). Acceleration of gravity g=980.6 (cm/s/s).

Thus, the sum of the spinning acceleration and the revolution acceleration was 38.2 times as much as the acceleration of gravity as follows:

By analyzing by XRD, it was clarified that the crystalline phases of this powder were composed of aluminum hydroxide and magnesium hydroxide as the main component and a mixture of the following three complex hydroxides:

$MgAl_2(OH)_8$, $Mg_2Al(OH)_{10}\cdot xH_2O$ and $Mg_4Al_2(OH)_{14}\cdot 3H_2O$;

with a small amount an unidentified phase.

(No peak assignable to $ZrO_2$ contaminant from the $ZrO_2$ milling medium was detected.) By analyzing the grain size distribution by the dynamic light scattering method, it was found out that 80% by weight or more of the grains of this powder had grain diameter of 350 nm or less.

Next, 50 g of this powder containing the complex hydroxide as the main component was transferred into an alumina crucible and heated at 1,000° C. for 5 hours to thereby give a spinel powder.

The spinel powder thus obtained was an $MgAl_2O_4$ spinel powder having an Mg/Al molar ratio of 1/2.

Next, this spinel powder was dispersed in water (non-volatile solid content (Nv): 35%) as in Example 1 and milled to give a spinel slurry containing the $MgAl_2O_4$ spinel powder having an average diameter of 6 μm.

This spinel powder had a specific surface area of 47 m²/g. This spinel powder had a mean pore diameter (d) of 21 nm and the pores thereof were regular in size, i.e., 72% of the total pore volume falling within a range of d±d/2. It was not contaminated with $ZrO_2$ powder formed by the abrasion of the milling medium.

EXAMPLE 11

An aluminum hydroxide powder having an average diameter of 17 μm and a magnesium hydroxide powder having an average diameter of 19 μm were mixed together to give an Mg/Al molar ratio of 1/2. 200 g of the resultant mixture was added to 4 l of water and dispersed therein by stirring with a propeller stirrer for 5 minutes.

Next, 1.4 l of this dispersion was introduced into a $ZrO_2$ pot (internal volume: 4 l) packed with $ZrO_2$ balls (10 mm) to 4/5 of the internal volume. Then, milling was performed for 10 hours by using the vibrating ball mill, thereby converting a part of the aluminum hydroxide and a part of the magnesium hydroxide into a crystalline complex hydroxide.

The rotation of the mill was stopped at intervals of 1 hour and the pot was cooled by blowing air thereto to thereby prevent the sample from being heated by the exothermic milling. In this case, the acceleration applied to the milling medium was about 10 times as much as the acceleration of gravity. Then, water was removed from the milled substance by drying at 150° C. for 10 hours to thereby give a powder.

By analyzing by XRD, it was clarified that the crystalline phases of this powder were composed of aluminum hydroxide and magnesium hydroxide as the main component and a mixture of the following three complex hydroxides:

$MgAl_2(OH)_8$, $Mg_2Al(OH)_{10} \cdot xH_2O$ and $Mg_4Al_2(OH)_{14} \cdot 3H_2O$;

with a small amount an unidentified phase.

(No peak assignable to $ZrO_2$ contaminant from the $ZrO_2$ milling medium was detected.) By analyzing the grain size distribution by the dynamic light scattering method, it was found out that 80% by weight or more of the grains of this powder had grain diameter of 500 nm or less.

Next, 50 g of this powder containing the complex hydroxide as the main component was transferred into an alumina crucible and heated at 1,000° C. for 5 hours to thereby give a spinel powder.

The spinel powder thus obtained was an $MgAl_2O_4$ spinel powder having an Mg/Al molar ratio of 1/2.

Next, this spinel powder was dispersed in water (non-volatile solid content (Nv): 35%) as in Example 1 and milled to give a spinel slurry containing the $MgAl_2O_4$ spinel powder having an average diameter of 10 μm.

This spinel powder had a specific surface area of 44 m²/g. This spinel powder had a mean pore diameter (d) of 22 nm and the pores thereof were regular in size, i.e., 70% of the total pore volume falling within a range of d±d/2. It was not contaminated with $ZrO_2$ powder formed by the abrasion of the milling medium.

COMPARATIVE EXAMPLE 1

An aluminum hydroxide powder having an average diameter of 17 μm and a magnesium hydroxide powder having an average diameter of 19 μm were mixed together to give an Mg/Al molar ratio of 1/2. 100 g of the resultant mixture was added to 2 l of water and dispersed therein by stirring with a propeller stirrer for 5 minutes. Then, water was removed from the milled substance by drying at 150° C. for 10 hours to thereby give a powder.

50 g of the mixture powder obtained above was transferred into an alumina crucible and heated at 1,000° C. for 5 hours. By analyzing by XRD, it was clarified that the crystalline phases of the thus obtained powder were composed of MgO and γ-$A_2O_3$ and the content of $MgAl_2O_4$ therein was 5% or less. The specific surface area of this powder was 35 m²/g.

COMPARATIVE EXAMPLE 2

50 g of the mixture powder obtained in the above Comparative Example 1 was transferred into an alumina crucible and heated at 1,700° C. for 5 hours to thereby give a spinel powder. The powder thus obtained was composed mainly of $MgAl_2O_4$ together with MgO and α-$Al_2O_3$. The specific surface area of this powder was 0.5 m²/g.

Comparison of the above-described Example 7 with Comparative Examples 1 and 2 clearly indicates that when a powder composed of hydroxides and a complex hydroxide having a grain diameter of 100 nm or less obtained via conversion into the complex hydroxide by mechanically mixing/milling (as in Example 7) was used, an $MgAl_2O_4$ spinel powder could be easily formed by heating at a low temperature of 1000° C. (i.e., lower than 1100° C.).

In this case, it was possible to obtain an $MgAl_2O_4$ spinel powder which was contaminated with little $Al_2O_3$ and/or MgO, showed uniform solid dissolution of Al and Mg and had a large specific surface area.

When "no such mechanical mixing/milling" was effected as in Example 7, in contrast thereto, the obtained powder was composed of MgO and γ-$Al_2O_3$ and the content of $MgAl_2O_4$ therein was 5% or less (analyzed by XRD) even though after heating at the same temperature of 1000° C. as in Example 7 (Comparative Example 1).

When a mixture powder subjected to neither mechanical mixing nor milling was heated at 1700° C. (Comparative Example 2), the obtained powder was composed mainly of $MgAl_2O_4$ but contaminated with MgO and α-$Al_2O_3$. In this case, moreover, the specific surface area of this powder was 0.5 m²/g.

Table 1 summarizes the physicochemical data (specific surface area, average diameter, a mean pore diameter (d), and pore distribution (the ratio of pores falling within the range of d±d/2 based on the total pore volume)) of the spinel powders obtained in the above Examples 1 to 11 and Comparative Examples 1 and 2.

TABLE 1

Physicochemical Data of Spinel Powder

| | Specific surface area (m²/g) | Average diameter (μm) | Mean pore diameter (d) (nm) | Pore distribution* (%) |
|---|---|---|---|---|
| Ex. 1 | 80 | 12 | 15 | 85 |
| Ex. 2 | 82 | 11 | 13 | 80 |
| Ex. 3 | 126 | 11 | 14 | 70 |
| Ex. 4 | 87 | 10 | 11 | 70 |
| Ex. 5 | 68 | 7 | 16 | 70 |
| Ex. 6 | 55 | 9 | 18 | 70 |
| Ex. 7 | 57 | 12 | 18 | 70 |
| Ex. 8 | 42 | 11 | 25 | 75 |
| Ex. 9 | 46 | 14 | 21 | 70 |
| Ex. 10 | 47 | 6 | 21 | 72 |
| Ex. 11 | 44 | 10 | 22 | 70 |
| Comp. Ex. 1 | 35 | — | — | — |
| Comp. Ex. 2 | 0.5 | — | — | — |

*the ratio of pores falling within the range of d ± d/2 based on the total pore volume.

<Example 1 of Catalyst with the use of Spinel Powder According to the Present Invention>
Preparation of Catalyst Each of the spinel slurries obtained in the above Examples 1 to 4 was filtered and dried to give a spinel powder. By using this spinel powder as a support, an $NO_x$ storage catalyst of "K(0.2 mol)/Pt(2 g)/support (120 g)" was produced in the following manner.

While stirring 30 g of the above-described spinel powder (support) in 300 g of deionized water in a 500 ml beaker, 11.1 g of a 4.5% by weight solution of platinum nitrate was added so that platinum was selectively adsorbed on the spinel powder (support). Then it was filtered, dried at 110° C. and calcined at 300° C. for 3 hours to give a "Pt (2 g)/support (120 g)" catalyst. Then water was evaporated from the catalyst by stirring it in an aqueous solution prepared by dissolving 4.9 g of potassium acetate in 200 g of deionized water. After drying and calcining under the same conditions as those described above, a "K(0.2 mol)/Pt (2 g)/support (120 g)" $NO_x$ storage catalyst was obtained. (Since it has been a practice to express the amount of K or Pt "per 120 g of support", the expression "support (120 g)" is employed herein.)

(Evaluation Test on Catalyst: "Determination of $NO_x$ Storage Capacity After Rich Spike Gas")

Each of the $NO_x$ storage catalysts produced by the above-described method with the use of the spinel powders obtained in Examples 1 to 4 and Comparative Examples as a support was subjected to the following evaluation test.

In this evaluation test, each catalyst was subjected to the high temperature durability treatment as described below and then the "$NO_x$ storage capacity after rich spike gas" was determined. Then each catalyst was evaluated based on the comparison of the thus obtained data.

High temperature durability test conditions

Figure 1:
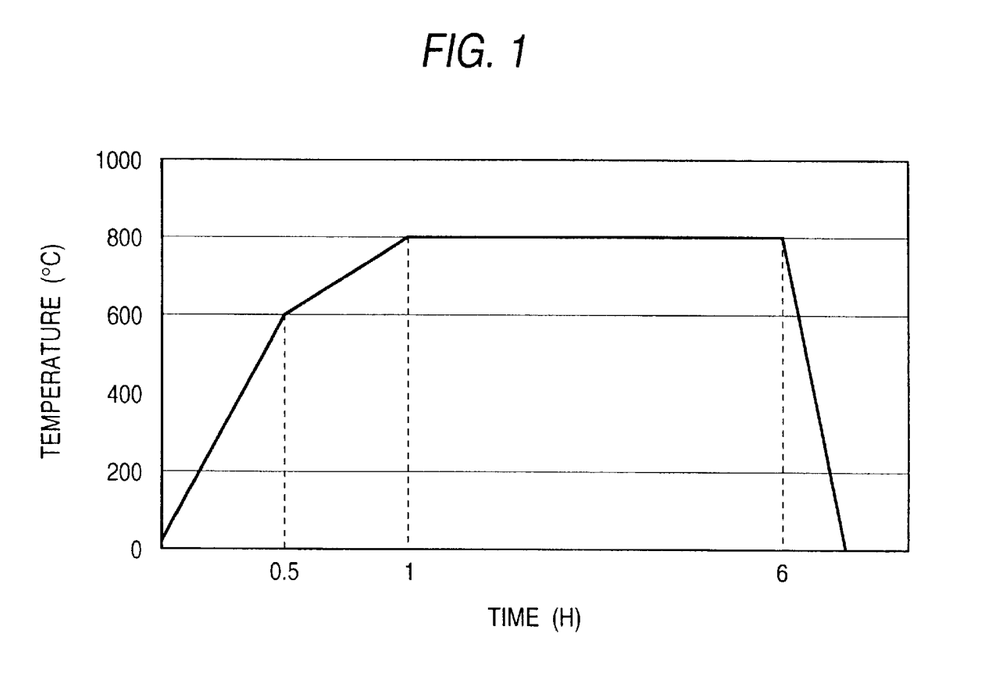
FIG. 1 is a graph which shows a temperature pattern in a high temperature durability test.

By using the temperature pattern as shown in FIG. 1, a model gas high temperature durability test was performed for 5 hours at 800° C., each cycle consisting of "rich atmosphere for 4 minutes and lean atmosphere for 1 minute" (catalyst employed: 1 g, flow rate: 1 l/min). Table 2 shows the gas compositions in this durability treatment.

TABLE 2

Gas Composition (%) in High Temperature Durability Test

| | $O_2$ | NO | $C_3H_6$ (% C) | CO | $H_2$ | $CO_2$ | $H_2O$ | $N_2$ |
|---|---|---|---|---|---|---|---|---|
| Lean (A/F = 22) | 6.7 | 0.16 | 0.20 | 0.08 | 0 | 8.4 | 3 | the balance |
| Rich (A/F = 14) | 0.18 | 0.17 | 0.21 | 0.69 | 0.23 | 8.9 | 3 | the balance |

(Determination of $NO_x$ Storage Capacity After Rich Spike Gas)

Under converting the lean atmosphere into the rich one (flow rate: 3 l/min) for 3 seconds, "the $NO_x$ storage capacity after rich spike gas at 600° C." was determined for each of the above-described catalysts (0.5 g) after the high temperature durability treatment. Namely, $NO_x$ in the catalyst was completely removed by the rich treatment and then the lean atmosphere (as defined in Table 3) was introduced into the system. Thus, $NO_x$ was stored by the storage ingredients and later attained the saturation. Then the atmosphere was converted into the rich spike gas (as defined in Table 3) for 3 seconds. Thus, the stored $NO_x$ was reduced by the reducing agents (HC, CO, $H_2$, etc.) in the rich gas and released as nitrogen. Subsequently, the atmosphere was converted into the lean one again and thus $NO_x$ was newly stored in the same amount as released above. The amount thus determined corresponds to the "$NO_x$ storage capacity after rich spike gas at 600° C.".

Table 4 shows the results of the determination of the $NO_x$ stored.

TABLE 3

Lean and Rich Spike Gas Compositions (%)

| | $O_2$ | CO | $H_2$ | $C_3H_6$ (% C) | NO | $H_2O$ | He |
|---|---|---|---|---|---|---|---|
| Lean | 4.10 | 0.05 | 0.02 | 0.24 | 0.08 | 0 | the balance |
| Rich Spike | 0.00 | 3.33 | 1.11 | 0.40 | 0.01 | 0 | the balance |

TABLE 4

$NO_x$ Storage Capacity After Rich Spike Gas at 600° C.

| Support "$D_1/D_2$ Value" | $NO_x$ Storage Capacity After Rich Spike Gas (μmol) |
|---|---|
| Ex. 1 "$D_1/D_2$ = 0.32" | 120.7 |
| Ex. 2 "$D_1/D_2$ = 23.7" | 136.1 |
| Ex. 3 "$D_1/D_2$ = 1.85" | 84.2 |
| Ex. 4 "$D_1/D_2$ = 4.13" | 74.6 |

(Note)
$D_1$: average diameter of starting aluminum hydroxide.
$D_2$: average diameter of starting magnesium hydroxide.

Table 4 proves the following facts.

The $NO_x$ storage catalysts of Examples 1 to 4 show large $NO_x$ storage capacity after rich spike gas and excellent $NO_x$ reduction performance.

The $NO_x$ storage catalysts of Examples 1 and 2 are superior in $NO_x$ reduction performance to those of Examples 3 and 4. (Although the reason therefor can be hardly illustrated theoretically, it can be estimated as follows. In Examples 1 and 2, use was made as the support of spinel powders obtained by using starting materials with $D_1/D_2$ ratio of "0.32" and "23.7" respectively. In Examples 3 and 4, on the other hand, the employed starting materials had $D_1/D_2$ ratios of "1.85" and "4.137" respectively. The above difference in $NO_x$ reduction performance might be based on this difference in the grain diameter ratio of the starting materials.)

<Example 2 of Catalyst with the use of Spinel Powder According to the Present Invention>

Before illustrating this example 2 of the catalyst, the properties of a coating film formed by dip coating the spinel slurry according to the present invention were tested in the following manner.

(Test on Dip Coat Film Properties)

The $MgAl_2O_4$ spinel powder obtained in the above-described Example 1 was dispersed in water to give a slurry sample of non-volatile solid content (Nv) of 35%. 300 cc of this slurry sample was introduced into a zirconia pot (capacity: 500 cc). After setting a planetary ball mill (manufactured by Fritsch) to graduation 5, the slurry was milled by using 200 cc of zirconia ball (diameter: 3 mm) for each period (min) as defined in Table 5.

Table 5 shows the data of the average diameter (μm) of spinel grains in the sample having been milled for each milling time. After the completion of the milling, an alumina plate (thickness: 5 mm, 3×10 cm) was dipped in each slurry sample so as to form a spinel coating layer (a dip coat film) on the surface of the alumina plate. Then the properties of this dip coat film were examined. Table 5 shows the results too.

(Evaluation Test on "Easiness in Application" and "Resistance to Peeling-off")

Further, the milled slurry samples were evaluated in "easiness in application" and "resistance to peeling-off" in accordance with the following criteria. Table 5 shows the results too.

Criteria for evaluating "easiness in application"
  ○: showing adequate film thickness and being free from cracking.
  Δ: being free from cracking but insufficient in film thickness, or showing adequate film thickness but suffering from cracking.
  x: hardly adhering or suffering from serious cracking.

Criteria for evaluating "resistance to peeling-off"

○: hardly peeling off, when subjected to ultrasonic washing in water or air-spraying with a compressor.

Δ: 50% or more of the film remaining, when subjected to ultrasonic washing in water or air-spraying with a compressor.

x: almost peeling off, when subjected to ultrasonic washing in water or air-spraying with a compressor.

TABLE 5

Film Properties, Easiness in Application and Resistance to Peeling-off of Dip Coat Film

| Milling time (min) | Average diameter ($\mu$m) | Dip coat film properties | Easiness in application | Resistance to peeling-off |
|---|---|---|---|---|
| 0 | 59.5 | no adhesion | x | x |
| 5 | 25.3 | little adhesion thin film | x | x |
| 10 | 21.8 | coarse texture somewhat thin film | x | x |
| 15 | 17.6 | " | Δ | Δ |
| 20 | 15.6 | " | Δ | Δ |
| 30 | 11.2 | no coarse texture thickened film | ○ | ○ |
| 40 | 9.4 | further thickened film no cracking | ○ | ○ |
| 50 | 8.0 | " | ○ | ○ |
| 60 | 6.8 | further thickened film slight cracking | ○ | ○ |
| 120 | 4.8 | cracking | Δ | Δ |
| 180 | 3.8 | cracking partly peeling-off | Δ | Δ |
| 240 | 2.9 | mostly peeling off due to dryness | x | x |

As Table 5 clearly shows, the dip coat films formed by using the spinel powders having average diameter of "3 to 20 $\mu$m" as specified in the present invention (milling time: 15 to 180 minutes) showed each a certain adhesion thickness and acceptable cracking.

When the average diameter fell within the range of 5 to 15 $\mu$m (milling time: 30 to 60 minutes), in particular, adequate film thickness was obtained and the films were free from cracking. In these cases, moreover, the films showed good adhesion and scarcely peeled off even in ultrasonic washing in water or air-spraying with a compressor.

When the spinel powders of average diameter of 20 $\mu$m or more, i.e., excluded from the scope of the present invention, (milling time: 15 minutes or less) were used, in contrast thereto, the obtained coating films were poor in adhesion and insufficient in thickness. When the spinel powder of average diameter of 3 $\mu$m or less, i.e., also excluded from the scope of the present invention, (milling time: 240 minutes or more) was used, the obtained coating film was adequate in thickness but suffered from serious cracking. In this cases, the film spontaneously peeled off after drying.

The milling time as employed herein means the time needed in milling with a planetary ball mill under the conditions as defined above. As a matter of course, the milling time varies depending on the milling method and conditions employed. The present invention is not restricted to a specific milling method or conditions. Namely, it is important to mill the powder until the average diameter attains the definite value (3 to 20 $\mu$m)

(Catalyst Example 2)

To the spinel slurry prepared in the above-described Examples 1 to 4, a basic zirconia sol was added as a binder so as to give a solid content of 10% by weight based on the spinel powder. Further, platinum (Pt) and potassium (K), as an $NO_x$-storage ingredient, were added respectively in an amount of 2 g and 0.2 mol per 120 g of the support.

Then an alumina plate (thickness: 5 mm, 3×10 cm) was dipped in the thus obtained slurry and thus a catalytic layer was formed on the surface of the alumina plate, thereby giving an $NO_x$ reduction catalyst.

In these Examples 1 to 4, it was confirmed that a coating film which could be easily applied, scarcely peeled off and suffered form no cracking could be obtained by using the spinel slurry containing the binder, the noble metal (Pt) and the $NO_x$-storage ingredient (K). It was also confirmed that the catalyst thus obtained was excellent in $NO_x$ reduction performance.

As described above in detail, the spinel powder according to present invention can achieve a high catalytic activity when employed as a catalytic support. When employed as a support of a storage-reduction catalyst, in particular, it can establish an excellent $NO_x$ reduction performance.

The spinel slurry of the present invention can be easily applied onto a catalytic base material, for example, a honeycomb construction to form a coating layer scarcely peeling off and being free from cracking. Use of this slurry as a catalytic support makes it possible to obtain a catalyst which is excellent in catalytic activity. When it is employed as a support of a storage-reduction catalyst, in particular, a catalyst having an excellent $NO_x$ reduction performance can be obtained.

While the invention has been described in detail and with reference to specific examples thereof, it will be apparent to one skilled in the art that various changes and modifications can be made therein without departing from the spirit and scope thereof.

What is claimed is:

1. A spinel powder represented by a chemical formula $MgAl_2O_4$, wherein
   the spinel powder has a specific surface area of 40 m$^2$/g or more;
   an average diameter of the spinel powder ranges from 3 to 20 $\mu$m; and
   pores in the spinel powder having diameters falling within a range of d±d/2 from a mean pore diameter d, where 11 nm$\leq$d<50 nm, form at least 70% of the total pore volume of the spinel powder.

2. The spinel powder as claimed in claim 1, wherein the specific surface area of the spinel powder is 80 m$^2$/g or more.

3. The spinel powder as claimed in claim 1, wherein the spinel powder is produced by a process comprising
   preparing a hydroxide, and
   calcining the hydroxide.

4. The spinel powder as claimed in claim 3, wherein the preparing comprises coprecipitation of aluminum hydroxide and magnesium hydroxide.

5. The spinel powder as claimed in claim 1, wherein the spinel powder is produced by a process comprising
   preparing an aluminum salt by dissolving aluminum hydroxide in an acid,
   preparing a magnesium salt by dissolving magnesium hydroxide in an acid,
   reacting the aluminum salt and the magnesium salt to form a reacted product, and
   calcining the reacted product.

6. The spinel powder as claimed in claim 5, wherein a ratio $D_1/D_2$ of an average diameter of the aluminum hydroxide $D_1$ to an average diameter of the magnesium hydroxide $D_2$ is in a range of $1.85 \leq (D_1/D_2)$ or $0.5 > (D_1/D_2)$.

7. The spinel powder as claimed in claim 1, being in the form of a spinel slurry.

8. A method of making a spinel powder, the method comprising mixing aluminum hydroxide and magnesium hydroxide, and forming the spinel powder of claim 1.

9. A spinel powder represented by a chemical formula $MgAl_2O_4$, wherein the spinel powder has a specific surface area of 55 $m^2/q$ or more and an average diameter of from 3 to 20 $\mu m$; and pores in the spinel powder having diameters falling within a range of d±d/2 from a mean pore diameter d, where 11 nm≦d<50 nm, form at least 70% of the total pore volume of the spinel powder; and the spinel powder is produced by a process comprising
drying a solution containing a water-soluble organic substance having a boiling point of 120° C. or above to form a dried substance, and
converting the dried substance into a complex oxide by heating and then milling.

10. The spinel powder as claimed in claim 9, wherein the spinel powder is substantially free from a crystalline phase other than a $MgAl_2O_4$ spinel phase.

11. The spindle powder as claimed in claim 9, wherein the solution comprises water, a water-soluble inorganic aluminum salt and a water-soluble inorganic magnesium salt.

12. The spinel powder as claimed in claim 9, wherein the water-soluble organic substance is at least one member selected from the group consisting of monohydric alcohols, polyhydric alcohol monomers, dimers, trimers and oligomers each having a boiling point of 120° C. or above, water-soluble polymer compounds containing polymers of the polyhydric alcohols having a boiling point of 120° C. or above, monosaccharides, disaccharides, polysaccharides, carbohydrates, carboxylic acids, salts of carboxylic acids and surfactants.

13. The spinel powder as claimed in claim 9, being in the form of a spinel slurry.

14. A spinel powder represented by a chemical formula $MgAl_2O_4$, wherein the spinel powder has a specific surface area of 55 $m^2/q$ or more and an average diameter of from 3 to 20 $\mu m$; and pores in the spinel powder having diameters falling within a range of d ±d/2 from a mean pore diameter d, where 11 nm≦d<50 nm, form at least 70% of the total pore volume of the spinel powder; and the spinel powder is produced by a process comprising
drying a solution containing an aluminum salt of a water-soluble carboxylic acid and a magnesium salt of a water-soluble carboxylic acid to form a dried substance, and
converting the dried substance into a complex oxide by heating.

15. The spinel powder as claimed in claim 14, wherein the spinel powder is substantially free from a crystalline phase other than a $MgAl_2O_4$ spinel phase.

16. The spinel powder as claimed in claim 14, being in the form of a spinel slurry.

17. A spinel powder comprising $MgAl_2O_4$ as a main component, wherein the spinel powder has a specific surface area of 42 $m^2/q$ or more and an average diameter of from 3 to 20 $\mu m$; and pores in the spinel powder having diameters falling within a range of d±d/2 from a mean pore diameter d, where 11 nm≦d<50 nm form at least 70% of the total pore volume of the spinel powder; and the spinel powder is produced by a process comprising
mechanically mixing and milling a mixture of hydroxides to form a complex hydroxide,
mixing the complex hydroxide with an unconverted hydroxide to form a mixture, and
heating the mixture to form a complex oxide.

18. The spinel powder as claimed in claim 17, wherein the complex hydroxide is a water-containing salt.

19. The spinel powder as claimed in claim 17, wherein the mechanical mixing and milling are carried out in a medium-mixing mill.

20. The spinel powder as claimed in claim 17, wherein the hydroxide comprises magnesium hydroxide and aluminum hydroxide.

21. The spinel powder as claimed in claim 17, being in the form of a spinel slurry.

* * * * *